Feb. 8, 1927.
M. W. ARLEIGH
VEHICLE
Filed Nov. 16, 1925
1,616,839
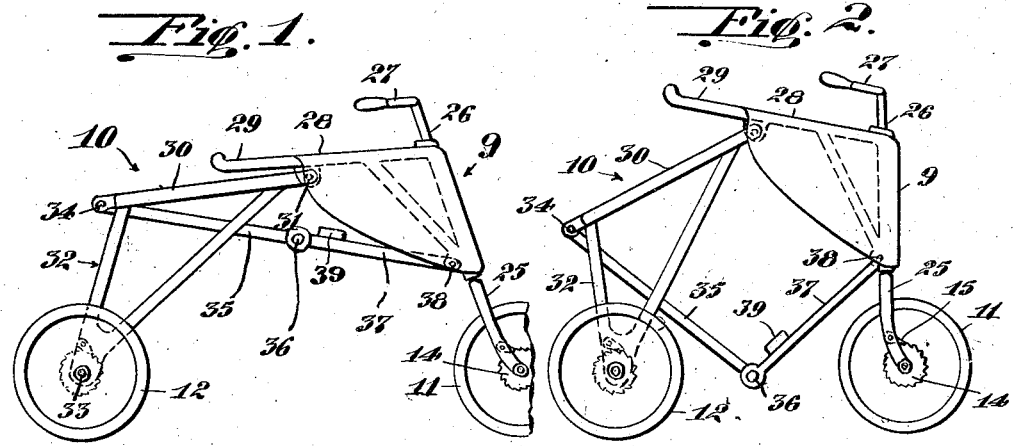
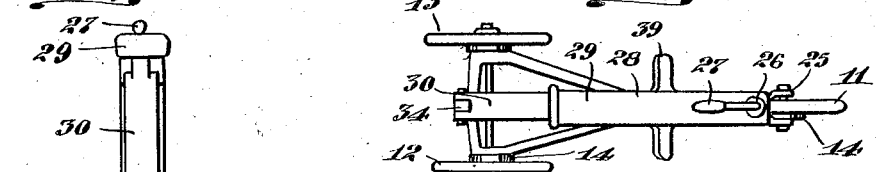
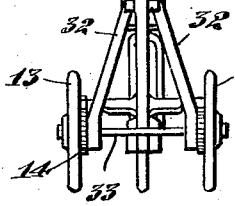
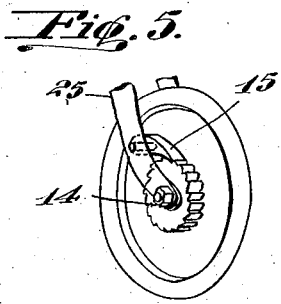
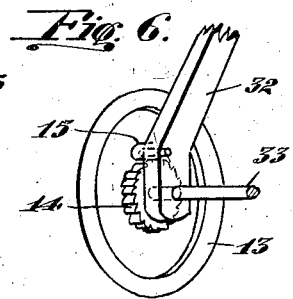
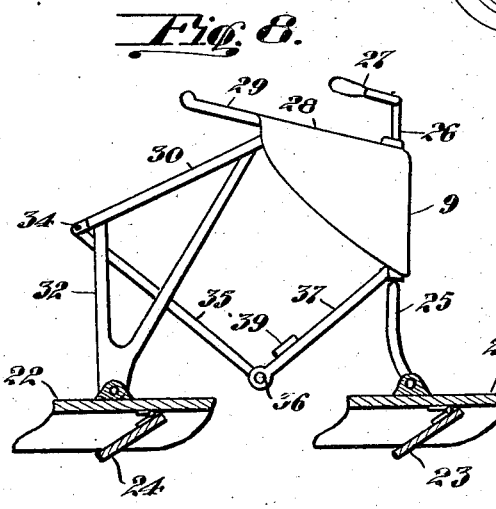
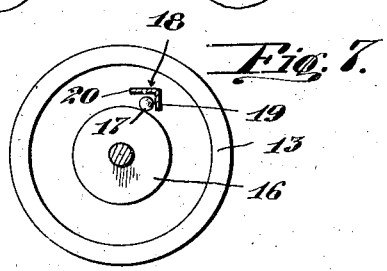
Inventor.
Mabel W. Arleigh
By R. S. Berry
Attorney.

Patented Feb. 8, 1927.

1,616,839

UNITED STATES PATENT OFFICE.

MABEL W. ARLEIGH, OF LOS ANGELES, CALIFORNIA.

VEHICLE.

Application filed November 16, 1925. Serial No. 69,340.

This invention particularly pertains to a vehicle of a manually propelled type and more especially relates to a mechanism for effecting propulsion of a vehicle with a step-by-step movement.

An object of the invention is to provide a vehicle of the above character embodying front and rear trucks which are adapted to be alternately advanced to cause the vehicle to travel with a step-by-step motion, and in which the propulsion of the vehicle is effected by the rider imposing his weight alternately on a seat and a foot rest.

Another object is to provide a vehicle of the class described which is especially advantageous for use as an exerciser, but which may also be employed as an amusement device and especially as a child's toy.

With the foregoing objects in view, together with such other objects and advantages as may subsequently appear, the invention resides generally in the provision of a vehicle embodying front and rear truck members articulately connected together and including means whereby the truck members may be advanced step-by-step in a forward direction and be inhibited against retrograde movement, and further resides in providing such a structure with a seat, a foot rest, and a steering means.

The invention further resides in the parts and in the construction, combination and arrangement of parts hereinafter described and claimed and illustrated by way of example in the accompanying drawings, in which:—

Figs. 1 and 2 are views of the vehicle as seen in side elevation showing it as fitted with front and rear wheels and illustrating it in its alternate positions; Fig. 1 showing the trucks as spread or extended in relation to each other, and Fig. 2 showing the trucks as contracted in relation to each other;

Fig. 3 is a view of the vehicle as seen in rear elevation;

Fig. 4 is a plan view;

Fig. 5 is a detail in perspective illustrating a means for limiting rotation of the front wheel to a forward direction;

Fig. 6 is a perspective view illustrating a means for confining rotation of the rear wheels to a forward direction;

Fig. 7 is a view in elevation illustrating a modified form of the device for limiting rotation of the wheels to one direction;

Fig. 8 is a view in side elevation of the vehicle showing it as fitted with sled runners.

Referring to the drawings more specifically, 9 and 10 indicate generally front and rear truck members, which may be fitted with wheels as shown in Figs. 1 and 2, or may be provided with sled runners as shown in Fig. 8.

Where the vehicle is equipped with wheels it is preferably constructed of the tricycle type, that is, with a single steering wheel 11 supporting the forward truck 9 and a pair of wheels 12 and 13 supporting the rear truck 10. Where the trucks are thus fitted with wheels, means are provided for confining the rotation of the wheels to a forward direction, which may be accomplished in any desired manner, such, for example, as by the use of a pawl and ratchet, as particularly shown in Figs. 5 and 6, in which 14 designates a ratchet wheel affixed to the vehicle wheel and 15 designates a pawl which normally engages the teeth of the ratchet wheel and cooperates with the latter in inhibiting retrograde motion of the wheel. This wheel-locking device may comprise a clutch, such, for example as shown in Fig. 7, in which 16 indicates a drum carried by the wheel on which seats a loose ball 17 held in place by a cage 18, which cage is carried by the vehicle frame and projects over the drum 16 and has a downwardly extending portion 19 from which leads a horizontally extending portion 20 projecting in tangential relation to the periphery of the drum 16. The wheel carrying the drum 16 may rotate in a direction which will cause the ball 17 to ride against the depending wall 19 of the cage shown in Fig. 7, but will be held against retrograde motion on imparting a reverse rotative effort thereto, such as will cause the ball 17 to ride against the wall 20 and effect wedge engagement therewith.

Where the truck members are fitted with sled runners as shown in Fig. 8, the front truck 9 is provided with a sled 21 and the rear truck 10 is provided with a sled 22 and mounted on the sleds 21 and 22 are depending grippers 23 and 24 which incline rearwardly and are adapted to effect engagement with the surface of the ice in such manner as to hold the sled runners against reverse movement on back pressure being imparted thereto.

As a means for effecting steering of the vehicle the front truck 9 is fitted with the usual yoke 25 carrying the steering wheel or sled, which yoke is mounted on a turnable shaft 26 suitably journalled in the front truck 9 and fitted at its upper end with a handle-bar 27 whereby the shaft 26 may be manually operated to effect steering of the vehicle in the manner common to velocipedes, bicycles and the like.

In carrying out my invention the front truck 9 is formed with a rearwardly extending top frame portion 28 fitted with a seat 29 and the rear truck 10 is formed with a forwardly extending top frame member 30 which projects beneath the seat 29 and is pivotally connected at its forward end as indicated at 31, to the portion 28 of the front truck 9, which pivotal connection between the front and rear truck members is located forward of the seat 29. This pivotal connection between the front and rear truck members is such as to permit vertical articulate movement of the truck members relative to each other, yet retain the truck members in longitudinal alignment. The frame member 30 of the rear truck 10 is provided with downwardly extending side frame members 32 which are spread apart and carrying a shaft 33 on which the rear wheels 12 and 13 are mounted.

Pivotally connecting with the rear end of the frame member 30 at 34 is a downwardly extending link 35 projecting obliquely beneath the frame member 30, the lower end of which link is pivoted at 36 to a link 37 projecting obliquely upward from the line 35 and pivotally connected at 38 to the frame of the front truck 9 at a point on a plane below and forward of the pivotal connection 31 between the front and rear trucks. It will now be seen that the pivotal connections 31, 34, 36 and 38 with the intervening link and frame portions constitute a collapsible trapezoidal arrangement of levers which are capable of affording a lazy-tong or articulate movement.

In the operation of the invention, the rider sits astride the seat 29 with feet positioned on a foot rest 39 carried by the line 37 and in effecting propulsion of the vehicle, he alternately imposes his weight on the foot-rest and seat.

When the vehicle is disposed with the trucks in their extended position, as shown in Fig. 1, the operator in imposing his weight on the foot-rest, depresses the link 37 and thereby causes the rear truck 10 to advance and to rock upwardly so as to move the seat 29 into an upward position, as shown in Fig. 2, whereupon on the operator imposing his weight on the seat and relieving the load on the foot-rest, the load imposed on the seat will then act to advance the forward truck 9. In this manner the vehicle will be caused to advance with a step-by-step movement with the rider alternately standing up and sitting down.

It will be understood that during operation of the vehicle, the advanced movement of one truck relative to the other in the manner described will occur by reason of the trucks being held against retrograde movement on each advance thereof.

While I have shown and described a specific embodiment of my invention, I do not limit myself to the exact details of construction or the arrangement shown, but may employ such changes and modifications as occasion may require coming within the spirit of the invention as defined in the accompanying claim.

I claim:—

In a vehicle of the character described, a front truck, a seat on said truck, a rear truck pivotally connected to said front truck in advance of said seat, a pair of depending links connected to said front and rear trucks, a foot rest on one of said links, and means for holding said trucks against retrograde movement with relation to each other.

MABEL W. ARLEIGH.